United States Patent
Holle et al.

(10) Patent No.: US 7,842,108 B2
(45) Date of Patent: Nov. 30, 2010

(54) GASIFICATION METHOD AND DEVICE FOR PRODUCING SYNTHESIS GASES BY PARTIAL OXIDATION OF FUELS CONTAINING ASH AT ELEVATED PRESSURE AND WITH QUENCH-COOLING OF THE CRUDE GAS

(75) Inventors: Bernd Holle, Freiberg (DE); Manfred Schingnitz, Freiberg (DE); Norbert Fischer, Lichtenberg (DE)

(73) Assignee: Siemens Aktiengesellschaft, München (DE)

( * ) Notice: Subject to any disclaimer, the term of this patent is extended or adjusted under 35 U.S.C. 154(b) by 1096 days.

(21) Appl. No.: 11/355,773

(22) Filed: Feb. 16, 2006

(65) Prior Publication Data

US 2007/0044381 A1  Mar. 1, 2007

(30) Foreign Application Priority Data

Aug. 24, 2005  (DE) ............... 10 2005 040 245

(51) Int. Cl.
- B01J 7/00 (2006.01)
- B01J 10/00 (2006.01)
- B01J 12/02 (2006.01)
- B01J 19/00 (2006.01)
- H01M 8/06 (2006.01)
- C01B 3/36 (2006.01)
- C10J 3/46 (2006.01)
- C10J 3/54 (2006.01)
- C10J 3/00 (2006.01)

(52) U.S. Cl. ................ 48/61; 48/197 R; 48/202; 48/203; 48/210; 422/129

(58) Field of Classification Search .......... 48/61, 48/197 R, 202, 203, 210
See application file for complete search history.

(56) References Cited

U.S. PATENT DOCUMENTS

| | | | | |
|---|---|---|---|---|
| 4,848,982 A | * | 7/1989 | Tolle et al. | 48/69 |
| 5,968,212 A | * | 10/1999 | Peise et al. | 48/101 |
| 2003/0089288 A1 | * | 5/2003 | Abrams | 110/233 |
| 2004/0170210 A1 | * | 9/2004 | Do et al. | 373/118 |

FOREIGN PATENT DOCUMENTS

| | | | |
|---|---|---|---|
| CN | 200 4200 200 7.1 | | 6/2004 |
| CN | 2700718 | | 5/2005 |
| DE | 197 131 A1 | | 10/1905 |
| DE | 35 34 015 | | 4/1986 |
| DE | 44 46 803 | | 6/1996 |
| EP | 0 677 567 | | 9/1997 |
| GB | 2004993 A | * | 4/1979 |
| WO | WO 96/17904 | | 6/1996 |

OTHER PUBLICATIONS

J. Carl, P. Fritz, Noell-Konversionsverfahren, EF-Verlag für Energie- und Umwelttechnik GmbH, 1996, p. 33 and p. 73.
C. Higman and M. van der Burgt, "Gasification", Verlag Elsevier, USA, 2003.

* cited by examiner

Primary Examiner—Alexa D Neckel
Assistant Examiner—Matthew J Merkling
(74) Attorney, Agent, or Firm—Collard & Roe, P.C.

(57) ABSTRACT

A method and device for the gasification of solid fuels such as bituminous coal, lignite coal, and petroleum coke in the flue stream with an oxidizing medium containing free oxygen, by partial oxidation at pressures between atmospheric pressure and 80 bar and at temperatures between 1,200 and 1,900 degrees. The fuel is gasified by pneumatic metering of pulverized fuel, gasification reaction in a reactor with cooled reactor chamber contour, quencher cooling, crude gas scrubbing, and partial condensation.

6 Claims, 3 Drawing Sheets

GASIFICATION METHOD AND DEVICE FOR PRODUCING SYNTHESIS GASES BY PARTIAL OXIDATION OF FUELS CONTAINING ASH AT ELEVATED PRESSURE AND WITH QUENCH-COOLING OF THE CRUDE GAS

BACKGROUND OF THE INVENTION

1. Field of the Invention

This invention relates to a gasification method and a device for implementing the method. The method consists of metered infeed of fuel, gasification in a reactor, quenching in a quencher, and gas scrubbing, to produce gases containing CO and $H_2$ by partial oxidation of dust-like fuels containing ash with a gasification medium containing free oxygen, at high temperatures and elevated pressure.

To achieve long operating times, the pressurized jacket of the gasification reactor has to be protected reliably against the action of crude gas and against the high gasification temperatures of 1200-1900° C. This is done by confining the reaction or gasification chamber with a cooled tubular shield that is hung in the pressurized jacket. The annular gap between tubular shield and pressurized jacket is flushed.

The fuel is fed to the head of the reactor in pulverized form through burners, using a pneumatic system by the flow transport principle. The crude gas leaves the gasification chamber together with the liquefied slag at the bottom of the reactor and is then cooled to a saturated state by injecting water, and is then freed of entrained fines. The scrubbed crude gas is then fed to further treatment steps.

2. The Prior Art

The autothermic entrained flow gasification of solid, liquid, and gaseous fuels has been known in the technology of gas production for years. The ratio of fuel to gasification medium containing oxygen is chosen so that higher carbon compounds are completely cracked for reasons of synthesis gas quality into synthesis gas components such as CO and $H_2$, and the inorganic components are discharged as molten slag; see J. Carl, P. Fritz, NOELL-KONVERSIONSVERFAHREN, EF-Verlag fur Energie- und Umwelttechnik GmbH, 1996, p. 33 and p. 73.

According to various systems used in the industry, gasification gas and molten slag can be discharged separately or together from the reaction chamber of the gasification device, as shown in German Patent No. DE 197 131 A1. Either systems with refractory linings or cooled systems are used for the internal confinement of the reaction chamber structure of the gasification system; see German Patent No. DE 4446 803 A1.

European Patent No. EP 0677 567 B1 and PCT Publication No. WO 96/17904 show a method in which the gasification chamber is confined by a refractory lining. This has the drawback that the refractory masonry is loosened by the liquid slag formed during gasification, which leads to rapid wear and high repair costs. This wear process increases with increasing ash content. Thus, such gasification systems have a limited service life before replacing the lining. Also, the gasification temperature and the ash content of the fuel are limited. Feeding in the fuel as a coal-water slurry causes considerable losses of efficiency—see C. Higman and M. van der Burgt, "Gasification", Verlag ELSEVIER, USA, 2003. A quenching or cooling system is also described in which the hot gasification gas and the liquid slag are carried off together through a conduit that begins at the bottom of the reaction chamber, and are fed into a water bath. This joint discharge of gasification gas and slag can lead to plugging of the conduit and thus to limitation of availability.

German Patent No. DE 3534015 A1 shows a method in which the gasification media, powdered coal and oxidizing medium containing oxygen, are introduced into the reaction chamber through multiple burners in such a way that the flames are mutually deflected. The gasification gas loaded with powdered dust flows upward and the slag flows downward into a slag-cooling system. As a rule, there is a device above the gasification chamber for indirect cooling utilizing the waste heat. However, there is the danger of plugging and/or erosion of the pipe system from the entrained dust. By separating the gasification gas and the slag, there is the danger of unwanted cooling of the slag and thus likewise the danger of plugging.

Chinese Patent No. CN 200 4200 200 7.1 describes a "Solid Pulverized Fuel Gasifier", in which the powdered coal is fed in pneumatically and gasification gas and liquefied slag are introduced into a water bath through a central pipe for further cooling. This central discharge in the central pipe mentioned is susceptible to plugging that interferes with the overall operation, and reduces the availability of the entire system.

SUMMARY OF THE INVENTION

It is therefore an object of the invention to provide a gasification method and a device that takes into account the different ash contents of fuels and has high availability.

The method according to the invention involves the gasification of solid fuels containing ash with an oxidizing medium containing oxygen, in a gasification chamber designed as an entrained flow reactor, at pressures between atmospheric pressure and 80 bar, in which the reaction chamber contour is confined by a cooling system, with the pressure in the cooling system always being chosen to be higher than the pressure in the reaction chamber, is distinguished by the following features:

The fuel, e.g. bituminous coal or lignite coal, is dried and pulverized to a grain size of <200 μm, preferably <100 μm, and is sent through an operational bunker to a pressurized sluice, in which the dust-like fuel is brought to the desired gasification pressure by feeding in a non-condensable gas such as $N_2$ or $CO_2$. This is between atmospheric pressure and 80 bar, preferably 25 to 45 bar. Different fuels can be used at the same time. By placement of multiple pressurized sluices, they can be filled and pressurized alternately. The pressurized dust then goes to a metering tank in the bottom of which a very dense fluidized bed is produced by similarly feeding in a non-condensable gas; one or more transport pipes are immersed into the bed and open into the burners of the gasification reactor. One or more burners can be used. The fluidized dust is caused to flow through these lines from the metering tank to the burners by applying a pressure differential. The amount of flowing pulverized fuel is measured, regulated, and monitored by measurement devices and monitors. There is also the possibility of mixing the pulverized fuel with water or oil and feeding it to the burner of the gasification reactor as a slurry. An oxidizing medium containing free oxygen is fed to the burners at the same time, and the pulverized fuel is converted into crude synthesis gas by partial oxidation. The gasification takes place at temperatures between 1,200° C. and 1,9000° C. The reactor is equipped with a cooling shield that consists of water-cooled pipes welded gas-tight. The hot crude synthesis gas leaves the gasification chamber together with the liquid slag formed from the fuel ash, and arrives at a quenching chamber in which the gas is cooled to the condensation point by spraying in water, at which point it is saturated with steam. Depending on the pressure, this saturation temperature is 180-2600° C. At the same time, the slag is converted to the granular state. The quenching chamber is an open area with no internals, to prevent deposition of slag or of dust entrained by the crude gas. The quenching water is introduced into the quenching chamber through nozzles that are located directly on the jacket. The granulated slag is discharged from the quenching chamber together with excess water through a slag sluice, and is depressurized. There can be one or more slag discharges. The crude gas saturated with steam, which leaves the quenching chamber from the side at 180-2600° C., is then freed of entrained dust. One or more gas outlets can be provided. For this purpose, the crude gas is first sent to a crude gas scrubber operated at process pressure, which is suitably a Venturi scrubber. The entrained dust is thereby removed down to a grain size of about 20 μm. This degree of purity is still inadequate for carrying out subsequent catalytic processes, for example crude gas conversion. It also has to be considered that salt mists are also entrained in the crude gas, which have detached from the powdered fuel during gasification and are carried off with the crude gas. To remove both the fine dust <20 μm and the salt mists, the scrubbed crude gas is fed to a condensation step in which the crude gas is chilled indirectly by 5° C. to 10° C. Water is thereby condensed from the crude gas saturated with steam, which absorbs the described fine dust and salt particles. The condensed water containing the dust and salt particles is separated in a following separator. The crude gas purified in this way can then be fed directly, for example, to a crude gas converter or desulfurization system.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT 320 tons/hour of bituminous coal with a composition of

Figure 1:
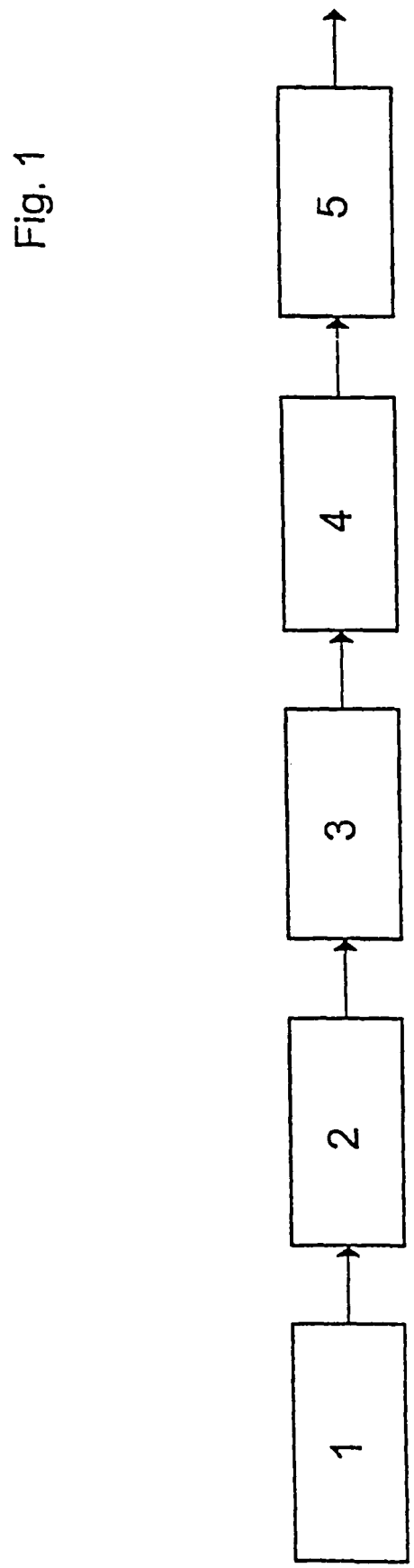
FIG. 1 shows a block diagram of the proposed method
Figure 2:
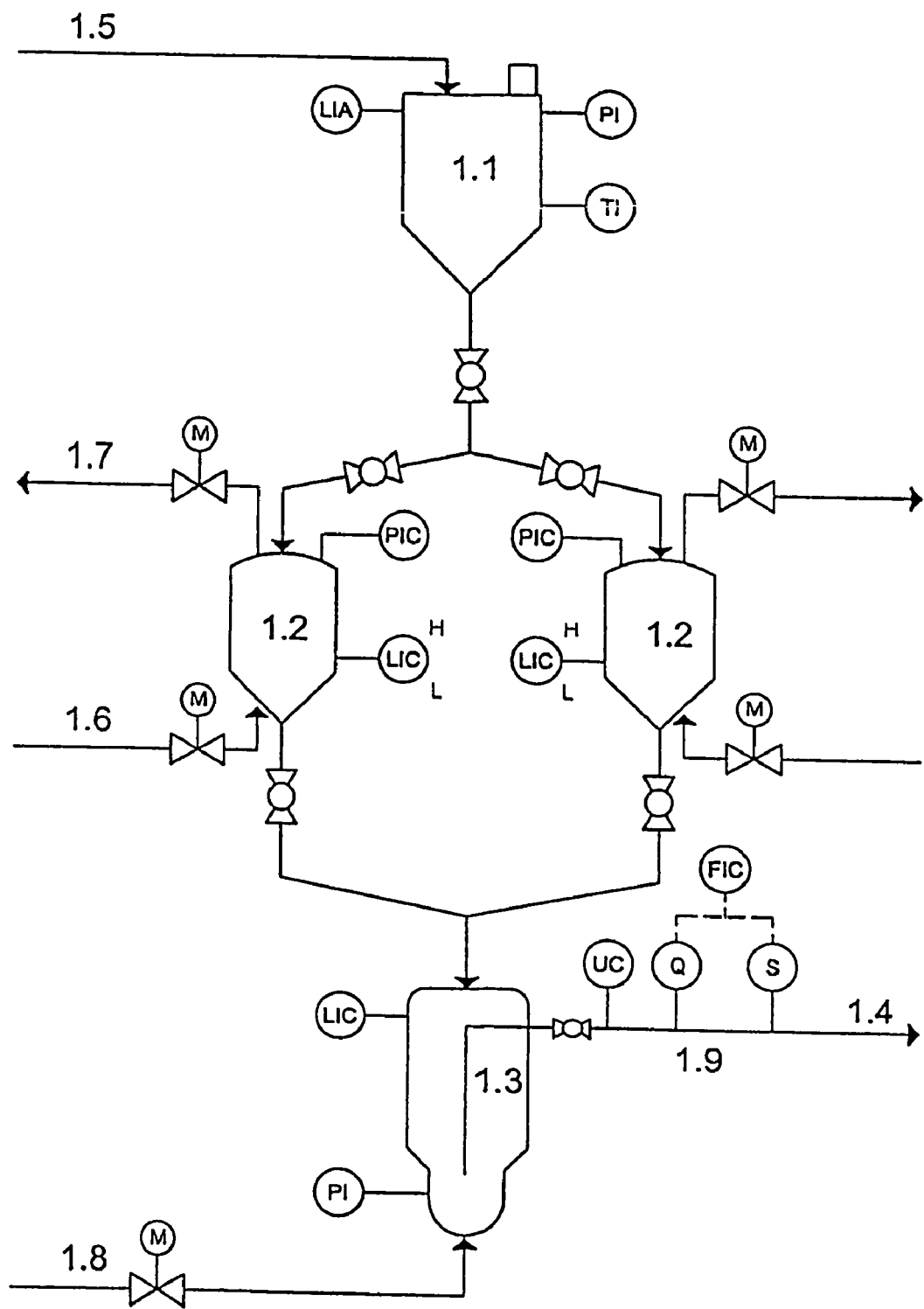
FIG. 2 shows a metering system for pulverized fuel

| | |
|---|---|
| C | 71.5 wt. % |
| H | 4.2 wt. % |
| O | 9.1 wt. % |
| N | 0.7 wt. % |
| S | 1.5 wt. % |
| Cl | 0.03 wt. %, | an ash content of 11.5 wt.%, and a moisture content of 7.8 wt.%, is to be gasified at a pressure of 40 bar. The calorific value of the coal is 25,600 kJ/kg. The gasification takes place at 1,450° C. 215,000 m³ I. H./h of oxygen is needed for the gasification. The coal is first fed to a state-of-the-art drying and grinding unit in which the water content is reduced to <2 wt.%. The grain size range after grinding is between 0 and 200 μm, and the amount of dried and ground pulverized fuel is 300 tons/hour. In accordance with FIG. 1, the ground pulverized fuel is fed to the metering system, which is shown in FIG. 2. The pulverized fuel is sent through the transport line 1.5 into the supply bunker 1.1 and is fed alternately to the pressurized sluices 1.2. The pulverized fuel is suspended in an inert gas such as nitrogen, for example, which is introduced through the line 1.6. After suspension, the pressurized pulverized fuel is fed to the metering tank 1.3. The pressurized sluice 1.2 is depressurized through the line 1.7 and can then be loaded again with pulverized fuel. There are three pressurized sluices that are alternately filled and depressurized. According to FIG. 3, three gasification reactors, each with a metering system, are provided for the gasification of 300 tons/hour of pulverized fuel. A dense fluidized bed is produced in the bottom of the metering tank 1.3, in which are immersed one or more dust transport lines 1.4, by feeding in a dry inert gas through the line 1.8 in an amount of 40,000 m³ I. H./h, likewise nitrogen, for example, that serves as the transport gas.

In this example, three transport lines are provided in each case. The amount of pulverized fuel flowing in the transport line 1.4 is monitored, measured, and regulated in the system 1.9, and is fed to the burner of the gasification reactor 2 in FIG. 1 or FIG. 3. The loading density is 250-420 kg/m³. The gasification reactor 2 is explained in further detail in FIG. 3. The pulverized fuel flowing through the transport lines 1.4 to the gasification reactor, 300 tons/hour, is subjected to partial oxidation at 1,450° C. in the gasification chamber 2.3 together with the oxygen in the amount of 215,000 m³ I. H./h flowing in through the line 2.1, with 596,000 m³ I. H./h of crude gas being formed, with the following composition:

| | |
|---|---|
| $H_2$ | 20.8 vol. % |
| CO | 71.0 vol. % |
| $CO_2$ | 5.6 vol. % |
| $N_2$ | 2.3 vol. % |
| $NH_3$ | 0.003 vol. % |
| HCN | 0.002 vol. % |
| $H_2S$ | 0.5 vol. % |
| COS | 0.07 vol. % |

Figure 3:
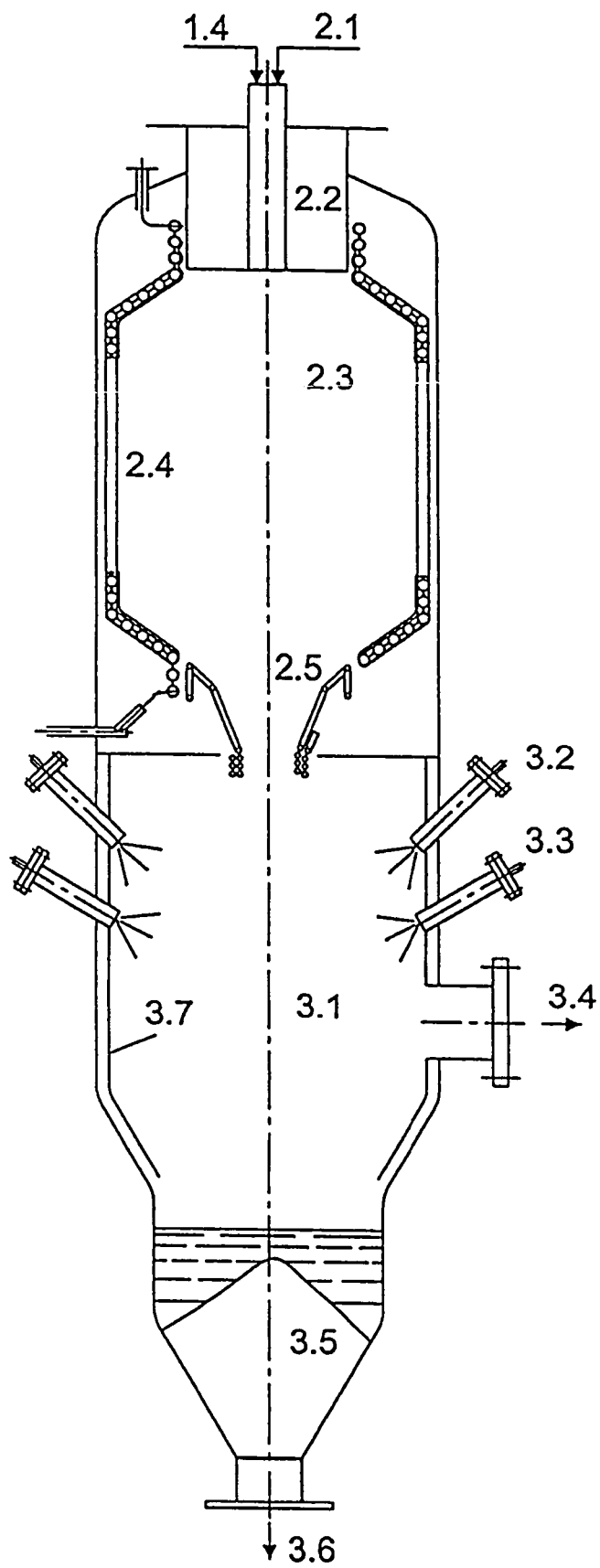
FIG. 3 shows a gasification reactor with quenching cooler.

The gasification chamber 2.3 is confined by a cooling shield 2.4 that consists of a water-cooled tube system welded gas-tight. The crude gas together with the liquid slag flows through the discharge opening 2.5 into the quenching cooler 3 (FIG. 1). The quenching cooler 3, connected rigidly to the gasification reactor 2 (FIG. 1), is shown in FIG. 3. It consists of a quenching chamber 3.1 made as an open space with no internals, into which water is sprayed through one or more rows of nozzles 3.2 and 3.3 to cool the hot crude gas. Condensate that occurs during the cooling of the crude gas in following system components is generally used to conserve fresh water. The amount of quenching water is about 500 m³/h. The crude gas saturated at 217° C. has a steam fraction of 57 vol.% at the outlet 3.4 from the quenching chamber. The slag is collected in a water bath 3.5 in the bottom of the quenching tank and is periodically discharged through the outlet 3.6. A wear shell 3.7 is provided to protect the pressurized jacket from erosion and corrosion.

The crude gas leaving the quenching chamber 3.1 through the outlet 3.4 in FIG. 3 then reaches the crude gas scrubber 4 in FIG. 1, designed as a Venturi scrubber, and is subjected to about 100 m³/h of wash water. Contained solids are removed from the wash water in the usual way and it is fed back again to the Venturi scrubber. To remove fine dust <20 μm in size and salt mists not separated in the Venturi scrubber, the water-washed crude gas is subjected to partial condensation 5 according to FIG. 1, with the crude gas being chilled indirectly from 217° C. to 211° C. The finest dust and salt particles are taken up by the steam condensing during the chilling and thus removed from the crude gas. The crude gas scrubber 4 and the partial condensation 5 to remove dust can be replaced by a separation step operating in wet or dry mode, in which the crude gas leaving the quenching chamber 3.1 is fed to a mechanical cleansing step, for example a centrifugal separator or a multiple tube filter. The crude gas cleansed of solids then has the following composition:

| | |
|---|---|
| $H_2$ | 9.5 vol. % |
| CO | 31.2 vol. % |
| $CO_2$ | 2.6 vol. % |
| $N_2$ | 1.1 vol. % |
| $NH_3$ | 0.001 vol. % |
| HCN | 0.001 vol. % |
| $H_2S$ | 0.200 vol. % |
| COS | 0.03 vol. % |
| $H_2O$ | 54.60 vol. % |

The purified wet crude gas amounts to 1,320,000 m³ NTP/h. It can be fed directly to a crude gas converter or other treatment steps.

Accordingly, while only a few embodiments of the present invention have been shown and described, it is obvious that many changes and modifications may be made thereunto without departing from the spirit and scope of the invention.

LIST OF REFERENCE SYMBOLS USED

1. Pneumatic metering system for pulverized fuel
1.1 Bunker
1.2 Pressurized sluice
1.3 Metering tank
1.4 Transport line
1.5 Transport line for pulverized fuel
1.6 Line for inert gas into 1.2
1.7 Pressure relief line
1.8 Line for inert gas into 1.3
1.9 Monitoring system
2. Reactor
2.1 Line for oxygen
2.2 Burner
2.3 Gasification chamber
2.4 Cooling shield
2.5 Discharge opening
3. Quenching cooler
3.1 Quenching chamber
3.2 Nozzle into 3
3.3 Nozzle into 3
3.4 Outlet from 3.1
3.5 Water bath
3.6 Discharge flow
3.7 Wear shell
4. Crude gas scrubber
5. Partial condensation

What is claimed is:

1. A device for generating crude gas having a particle size of fine dust of <20 μm in an entrained flow reactor by gasification of ash containing solid fuels such as bituminous or lignite coals and petroleum coke, with a water content of <10 wt % and a grain size of <200 μm, in the flue stream with an oxidizing medium containing free oxygen, by partial oxidation at pressures between atmospheric pressure and 80 bar, and at temperatures between 1,200 and 1900 degrees Celsius, the device comprising:

a pneumatic metering system adapted for pulverized fuel having a water content of less than 10 wt % and a grain size of <200 μm, comprising lines to a bunker whose outlet opens into at least one pressurized sluice, into which sluice open a line for inert gas and a line for depressurized gas, with discharge from the pressurized sluice leading to a metering tank, in the bottom of which tank there is a line for inert gas;

a reactor connected to the metering tank via a transport line, the reactor being adapted for gasifying supplied pulverized fuel with an oxidizing medium containing free oxygen at a temperature between 1200 and 1900° C. and at a pressure between atmospheric pressure and 80 bar, said reactor having a transport pipe for fluidized fuel and a line for an oxidizing medium that are fed by means of burners into a reaction chamber having a cooling shield consisting of water-cooled pipes welded gas-tight, and a discharge device;

a quenching cooler connected to the discharge device, said quenching cooler having no internals, so as to prevent deposition of slag or dust entrained by the crude gas, and in which nozzles are arranged in one or more nozzle rings, through which quenching water is sprayed in, with the nozzles ending flush with a wear shell made of metal that is placed to protect a pressurized jacket, said quenching cooler further comprising a water bath, an outflow, and an outlet;

a dust separator or crude gas scrubber located at the outlet of the quenching cooler; and a condensation stage connected to the dust separator or crude gas scrubber and following the dust separator or crude gas scrubber, said condensation stage being adapted for removing fine dust <20 μm and salt mists by indirectly cooling down the crude gas by 5 to 10° C.

2. A device pursuant to claim 1, wherein there are two pressurized sluices in parallel with one another.

3. A device pursuant to claim 1, wherein there are three transport pipes to transport fluidized pulverized fuel to the burner of the reactor.

4. A device pursuant to claim 1, wherein a stream of pulverized fuel in the transport pipe is monitored, measured, and regulated by a pressure gauge and/or a flow volumeter.

5. A device pursuant to claim 1, wherein a single- or multiple-stage Venturi scrubber is used for the crude gas scrubber.

6. A device pursuant to claim 1, wherein the crude gas scrubber triggers a crude gas converter or is followed by a desulfurization system.

* * * * *